United States Patent [19]
Sanders

[11] Patent Number: 4,874,926
[45] Date of Patent: Oct. 17, 1989

[54] ELECTRIC HEATING LOAD MANAGEMENT CONTROL

[76] Inventor: Steven B. Sanders, 69 Tiemann Pl., New York, N.Y. 10027

[21] Appl. No.: 233,717

[22] Filed: Aug. 17, 1988

[51] Int. Cl.$^4$ .............................................. H05B 1/02
[52] U.S. Cl. .................................. 219/486; 219/483; 219/494; 219/485; 219/508; 307/38; 307/40
[58] Field of Search .............................. 219/483–486, 219/494, 497, 501, 508, 509, 330, 476; 307/38–41, 117

[56] References Cited

U.S. PATENT DOCUMENTS

| | | | |
|---|---|---|---|
| 4,015,104 | 3/1977 | Eckman et al. | 219/476 |
| 4,305,005 | 12/1981 | McKenney et al. | 219/483 |
| 4,348,582 | 9/1982 | Budek | 219/483 |
| 4,559,441 | 12/1985 | Rudich, Jr. et al. | 219/364 |
| 4,562,338 | 12/1985 | Okami | 219/503 |
| 4,582,982 | 4/1986 | Peigari | 219/483 |
| 4,723,068 | 2/1988 | Kusuda | 219/483 |

Primary Examiner—M. H. Paschall
Attorney, Agent, or Firm—Robert E. Isner

[57] ABSTRACT

A low cost system for permitting the remote load management control of electrical residential room heating units that is compatible with existing heating systems of the type wherein each room heating element is controlled by a manually settable line voltage thermostat responsive to ambient room temperature. Included in the system is a normally closed low voltage operable thermal relay included immediately downstream of a resident circuit breaker and in the power transmission line for each room heating element and an associated single user programmable set back thermostat for shifting said thermal relays from normally closed to open position in response to residential dictated parameters of operation capable of also being operated in response to a remotely generated signal from a load management control center.

5 Claims, 2 Drawing Sheets

ELECTRIC HEATING LOAD MANAGEMENT CONTROL

This invention relates to load management control for consumption of electrical energy and more particularly to a system and apparatus for controlling electric power consumption by residential electrical heating elements.

BACKGROUND OF THE INVENTION

The ever increasing demand for electrical power and the attendant increase in peak load demands, particularly when considered in the light of current public resistance to the construction of new generating and transmission facilities, has created a serious problem of expanding severity to the electric utilities. One expedient that has been employed to reduce peak demand is to reduce the line voltage. Such however is basically undesirable for a number of practical reasons and is usually resorted to only in time of incipient emergency. Another expedient designed to ameliorate the above problem is the utilization of load management techniques to reduce peak demand by enabling the utility to directly control the ability of consumers to utilize certain electrical devices.

Load management control of consumer power consumption is a serious undertaking and, although simple in concept, is fraught with complex and practical problems. For example, not all loads are amenable to such control, both in the industrial consumer area and in the residential consumer area. In the latter area, load management has been effectively practiced in the control of residential water heaters and one suggested system therefore is described in U.S. Pat. No. 4,450,875. Power consumption by electric water heaters however is relatively small in terms of overall power quantities. Far greater amounts of power are consumed, for example, by residential electrical heating systems, such as electric resistance baseboard heating. Load management control of domestic electrical heating systems such as electric baseboard heating presents complex problems. Unlike water heater control, when control system failure results only in customer inconvenience, loss of system control for residential heating service can have potentially disastrous consequences including property damage and possible physical harm to the customer.

Electric space heating represents a significant electric load that, in most winter peaking utilities, has a major influence on the magnitude and timing of the electric system peak demand. Most electric home heating systems employ baseboard resistance heating elements and have separate control points, such as a line voltage thermostat in each room, and thus represent multiple heating systems within a single residence. At least two methods of automatic load control of baseboard resistance heating systems have been suggested, one being the installation of powerline carrier equipment to control the line voltage thermostats and the other being hard wiring of a low voltage control system onto an existing line voltage multiple control system. Both of these expedients involve excessive installation costs, which, for an average home installation, are economically impractical.

SUMMARY OF THE INVENTION

This invention can be briefly described, in its broader aspects, as a simple and comparatively inexpensive load management system for central control of power consumption by residential electrical heating elements. In its narrower aspects, the invention includes the selective installation of low voltage controllable and normally closed thermal relays adjacent to the downstream or outlet side of the residential circuit breaker in the in-residence power distribution lines leading to the individual electrical heating elements in association with an in-residence low voltage relay control for shifting said relays from closed to open position in response to a remotely generated control signal transmitted by radio frequency, when either through a V.H.F. or powerline carrier transmission channel, from a load management center to the residence being served. In a still narrower aspect, the subject invention includes the provision of a manually settable or programmable low voltage set back thermostat at a selected location within the residence to maintain said normally closed thermal relays in an open condition whenever the ambient temperature in the vicinity thereof is above the low set back temperature as chosen by the residence occupant, in association with means to override said low voltage set back thermostat to permit overriding control of the thermal relay positions in response to signals from a remote load management center.

Among the advantages of the subject invention is the provision of a relatively inexpensive and cost effective system for control of residential electric heating to effect system wide duty cycling and/or central set back capability with concurrent benefit to the residential customer including energy and cost reductions without adversely affecting consumer comfort or customer convenience. Another advantage includes the permitted utilization of conventional state of the art and readily available components and a basic compatability with existing electrical components conventionally employed in electrical residential heating systems. A still further advantage of the subject invention is the provision of a cost effective system that permits optimization of load management whereby, depending upon circumstances, a choice of which loads are to be controlled and for which selected periods of time are available for control purposes, thereby maximizing load reduction capability for the utility, while posing minimum impact on the customer.

The object of this invention is the provision of an improved and cost effective load management system for the control of electrical power consumption by residential electrical heating elements.

A further object of this invention is the provision of relatively inexpensive apparatus for installation in existing residential wiring systems for electrical baseboard space heating that facilitates remote load management control, including system wide duty cycling and/or central set back capability.

Other objects and advantages of te subject invention will become apparent from the following portions of this specification and from the appended drawings which depict, in accord with the mandate of the patent statutes, a presently preferred embodiment of a system incorporating the principles of this invention.

DETAILED DESCRIPTION OF THE INVENTION

Figure 1:
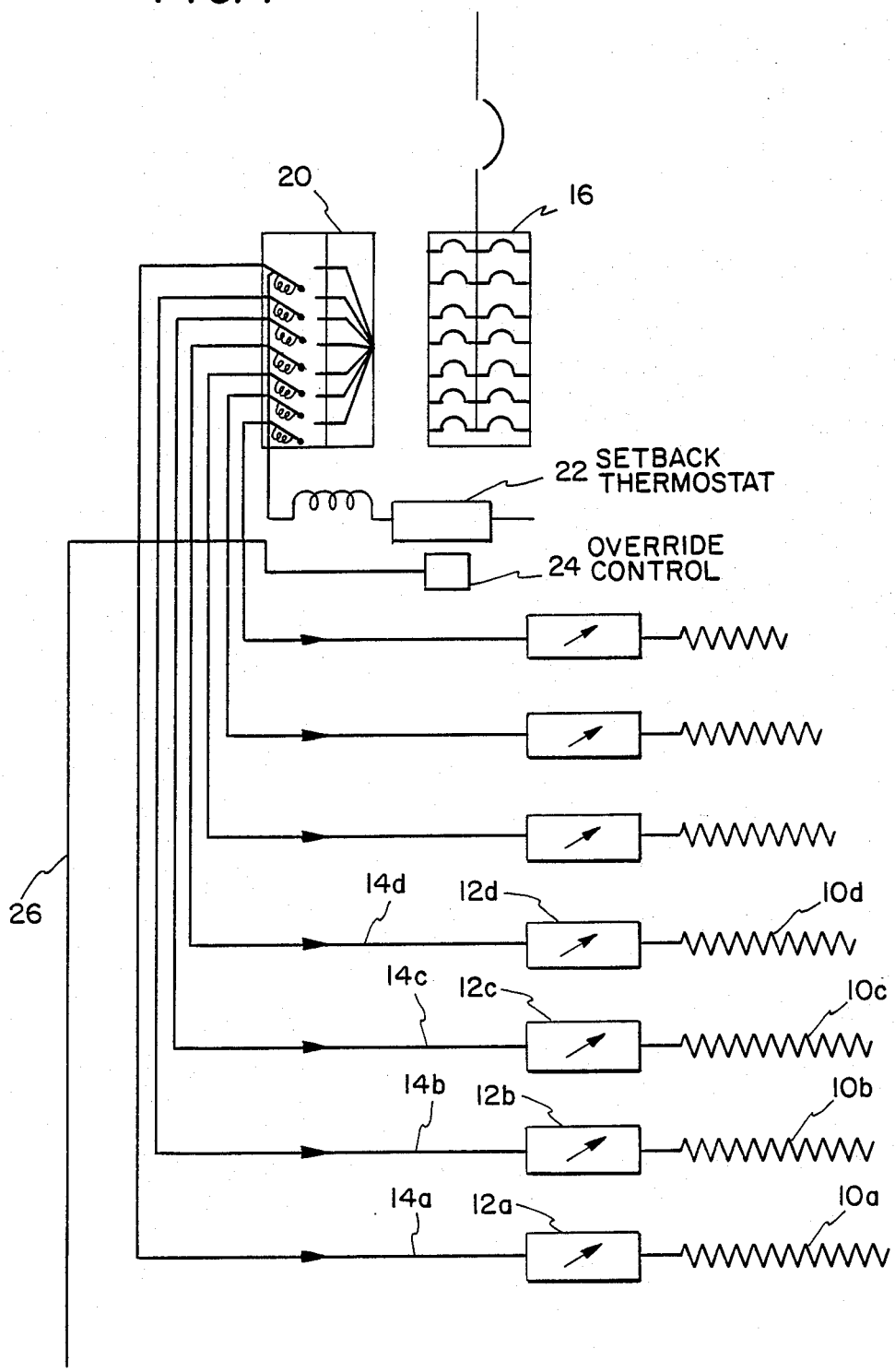
FIG. 1 is a schematic circuit diagram of a load management control system for a conventional and illustrative residential electrical resistance baseboard heating system that incorporates the principles of this invention.

Referring to the drawings, there is schematically depicted a conventional residential electrical baseboard heating system which typically includes a resistance type baseboard heating element 10a, b, c, d etc. and an associated manually settable line voltage thermostat 12a, b, c, d etc. for each room A, B, C, D etc. in a residence. Each of the heating elements is provided with electrical power through its individual power transmission line 14a, b, c, d etc. normally connected to the output or downstream side terminals of a circuit breaker 16, with each of the power lines having its own breaker assembly. In the normal operation of such system the residential occupant sets the thermostat in each room for the desired temperature level therein in accord with his own personal dictates. Such line voltage thermostat is usually of a single setting design with no set back capability either individual or central. As pointed out earlier load management control of such type residential heating system can only be effected through reduction in line voltage, an indiscriminate system or sub system approach, through installation of a powerline carrier signal systems within-house responsive control equipment for the individual lines to the heating elements or by the hard wiring of a low voltage control system into the existing line voltage multiple thermostat system. The first does not provide the flexibility attendant effective selective load control and the latter two are, at least at the present time, prohibitively expensive for retrofit to existing homeheating systems.

In accord with the principles of this invention the hereinabove described conventional wiring system employed for electrical residential heating surface is supplemented by the addition of a normally closed thermal relay 20a, b, c, d etc. in each of the individual power transmission lines 14a, b, c, d etc. preferably at a location adjacent the existing circuit breaker 16. Since each resistance heating circuit normally must, by local code, be protected by its own breaker, control of each of the thermal relays 20a, b, c, d etc. will control the current to the downstream line voltage thermostat 12a, b, c, d etc. and to the heating element 10a, b, c, d etc. therebeyond. Such thermal relays are adapted to low voltage control and are commercially available components obtainable for example as Model KU 6001-1 from the Midland Ross Corporation of N. Mankato, Minn.

Figure 2:
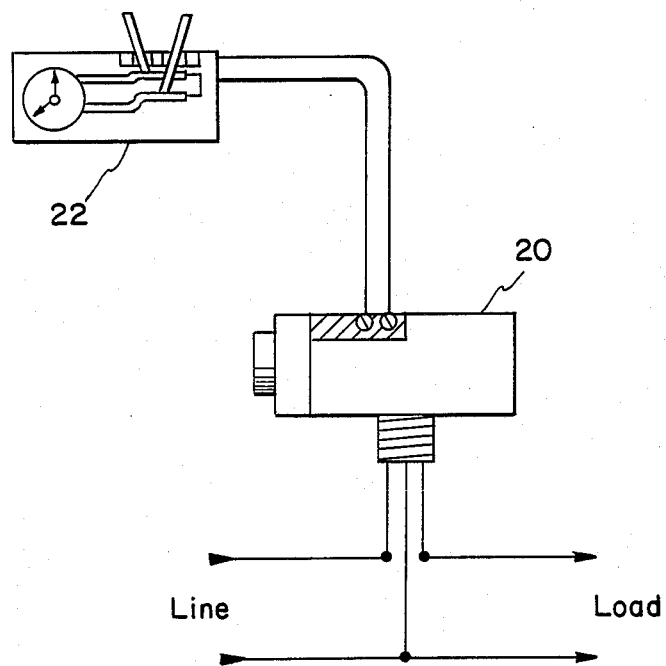
FIG. 2 is a simplified schematic diagram of the interconnection between a thermal relay and the master set back low voltage thermostat employable in the practice of the invention.

Low voltage control of the normally closed thermal relays 20a, b, c, d etc. is preferably provided by a single conventional programmable set back thermostat 22 which, as best shown in FIG. 2, includes manually settable upper and lower temperatures and, if desired, a timing control to determine the periods during which the selected lower set back temperature controls. The thermostat 22 is desirably physically located at or near the coldest location within the residence. In a preferred mode of operation, the thermostat 22 will be manually set by the residence occupant to provide a low set back temperature at, for example, 55° F. in the time period 9:00 a.m. to 4:00 p.m. and from 12:00 a.m. to 6:00 a.m. With such setting, the normally closed thermal relays will be automatically opened to preclude power transmission to any of the heating elements 10a, 10b, 10c, 10d etc. as long as the ambient temperature in the vicinity of the thermostat 22 remains above the low set back temperature of 55° F. during the 9:00 a.m. to 4:00 p.m. and 12:00 a.m. to 6:00 a.m. time periods. In the other time periods and as long as the upper set back temperature for the thermostat at 22, normally an occupant selected temperature in excess of that set for any of the line voltage thermostats 12a, b, c, d etc. is not exceeded, the thermal relays will return to their normally closed position permitting power transfer to the heating elements 10a, b, c, d etc. under control of the individual line thermostats 12a, b, c, d etc.

As will now be apparent, the above described utilization of a programmable set back thermostat 22 serves to permit minimal utilization of electric power for electrical heating purposes by the residential occupant. However the low set back temperature, e.g. 55° F., is one that is chosen and set by the residence occupant and, by itself, provides no selective load control management function abilities for the utility supplying the electric power. In accord with the principles of this invention, the low voltage set back thermostat 22 is provided with an override control 24 to effect opening of the normally closed thermal relays 20a, b, c, d etc., independent of thermostat 22 and local ambient time and temperature control parameters, in response to a signal generated at a remote system load management control point and transmitted to the override control 24 via a power line carrier transmission line 26 or by a V.H.F. radio band. A suitable override control device 24 is a Model 188-35B200 as manufactured by Potter & Brumfield Company of Princeton, Ind.

In the operation of the above described system, the selected low set back temperature on the low voltage thermostat 22 can function to reduce demand for power through a substantial portion of the day with consequent economies to the residential occupant. In association therewith, the override control 24 readily permits a remote load managment control function to interrupt availability of electrical power to the individual room baseboard heating elements 10a, b, c, d etc. in accord with electric system demand parameters. As will be apparent, the installation of the described thermal relays 20a, b, c etc., low voltage set back thermostat 22 and override control 24 is relatively inexpensive, at least as compared to the costs attendent other suggested systems, and when installed in a significant number of electrical heated residences, presents the opportunity for a substantial degree of management control of power consumption at all times, including peak demand periods. As will also be apparent, the described system permits remote control to be exercised for selected time periods as well as for selected residences to thereby provide a high degree of control flexibility, in an essentially fail-safe environment because of the normally closed condition of the thermal relays 20a, b, c d etc.

Having thus described my invention, I claim:

1. In a residential electrical heating system of the type that includes an individual electrical heating element in each of a plurality of rooms in a residence, a multiline circuit breaker having one side thereof connected to a remotely generated source of electrical power and a second side providing a plurality of power distribution outlets, an individual electrical power transmission line extending within said residence from a power distribution outlet on said circuit breaker to each of said heating elements and a manually settable thermostat disposed in each of said power transmission lines for controlling the transmission of electric power to each said heating element in response to a desired ambient temperature condition within said room, improved load management control means comprising a normally closed low voltage controllable thermal relay interposed in each said power transmission line intermediate the power distribution outlet on said circuit breaker and said manually settable thermostat therein, means disposed in said residence and settable by the occupant of the residence for shifting said normally closed thermal relays to the open condition independent of the ambient temperature conditions in said heating element containing rooms for precluding the flow of electrical power through said power transmission lines under predetermined residential dictated parameters of operation and signal generating means disposed remote from said residence for selectively and independently actuating said shifting means in response to extrinsic system load management parameters to open said thermal relays to preclude transmission of electric power to said electrical heating elements in said residence.

2. Load management control means as set forth in claim 1 wherein said shifting means comprises a manually settable low voltage set back thermostat for opening said normally closed thermal relays at all temperatures above a first predetermined lower limit at a selected location within said residence.

3. Load management control means as set forth in claim 1 wherein said shifting means includes a low voltage control circuit transformer coupled to said thermal relays.

4. Load management control means as set forth in claim 1 wherein said remote actuating means for said shifting means comprises a radio frequency communication channel intermediate a remote load management control center and said residence.

5. Load management control means as set forth in claim 2 further including means associated with said low voltage set back thermostat and responsive to said remote actuating means for overriding said low voltage set back thermostat and rendering said shifting means solely responsive to said remote actuating means.

* * * * *